July 7, 1925. 1,544,806
G. C. CHASE
FULL CYCLE STOP FOR CALCULATING MACHINES
Filed Jan. 16, 1922 3 Sheets-Sheet 1

July 7, 1925.

G. C. CHASE 1,544,806

FULL CYCLE STOP FOR CALCULATING MACHINES

Filed Jan. 16, 1922  3 Sheets-Sheet 2

INVENTOR
Geo. C. Chase
E. W. Anderson Jon
BY
ATTORNEY

July 7, 1925.　　　　　　　　　　　　　　　1,544,806
G. C. CHASE
FULL CYCLE STOP FOR CALCULATING MACHINES
Filed Jan. 16, 1922　　　3 Sheets-Sheet 3

INVENTOR
Geo. C. Chase.
E. D. Anderson

BY

ATTORNEY

Patented July 7, 1925.

1,544,806

UNITED STATES PATENT OFFICE.

GEORGE C. CHASE, OF SOUTH ORANGE, NEW JERSEY, ASSIGNOR TO MONROE CALCULATING MACHINE COMPANY, OF NEW YORK, N. Y., A CORPORATION OF NEW YORK.

FULL-CYCLE STOP FOR CALCULATING MACHINES.

Application filed January 16, 1922. Serial No. 529,426.

*To all whom it may concern:*

Be it known that I, GEORGE C. CHASE, a citizen of the United States of America, resident of South Orange, in the county of Essex and State of New Jersey, have made a certain new and useful Invention in Full-Cycle Stop for Calculating Machines; and I declare the following to be a full, clear, and exact description of the same, such as will enable others skilled in the art to which it appertains to make and use the invention, reference being had to the accompanying drawings, and to letters or figures of reference marked thereon, which form a part of this specification.

The invention has relation to a full-cycle stop for the numeral wheel actuating mechanism of calculating machines, whereby the operation of division may be rendered automatic and certain advantages secured in the performance of other arithmetical processes. An object of the invention is to provide such a stop which will be automatically operable and releasable in the manipulation of an operating device or crank handle for the actuating mechanism. Other objects and advantages will appear.

The invention consists in the novel construction and combinations of parts, as hereinafter set forth.

The accompanying drawings illustrate an embodiment of the invention as applied to a calculating machine of the type shown in the patent to E. F. Britten, Jr., No. 1,474,230. The above named patent discloses numeral wheel actuating mechanism of the reversible cycle type, as set forth in relation to the calculating machine art in the co-pending application of George C. Chase, Serial No. 602,366. Such machines employ a cycle of not less than three phases, a phase of ordinal registration in mid-cycle and a phase of tens carrying registration upon each side of the ordinal registration phase, the tens carrying phase which follows the ordinal registration alone being effective to register. The succession of the phases of the cycle may be reversed, so that the carry phase effective in positive registration, for instance, which follows the ordinal registration phase during additive registrations, will precede the latter phase in negative or subtractive calculations. This machine has a reversible drive, rotation of the crank handle in one direction being transmitted to the numeral wheels by direct gearing connection for the performance of arithmetical problems of one nature, as addition or multiplication, and reverse rotation of the crank handle being similarly transmitted and resulting in reverse rotation of the numeral wheels for the performance of problems of an opposite nature, as subtraction or division. It is, however, to be understood that in certain aspects the invention is adapted for use with machines operating upon other principles, as for instance wherein the numeral wheels or the actuating mechanism or both rotate in one direction only, without reversal.

As clearly indicated in Patent No. 1,474,230, the full-cycle position of the driving mechanism is that wherein a similar degree of movement thereof in either direction will complete a cycle of operation, and the first quarter rotation of the mechanism from full-cycle position in either direction is idle with respect to the transmission of movement in numeral wheels, this quarter rotation forming the idle additive or subtractive carry phase of the cycle.

According to the present invention, the operation of the machine will be stopped at the end of any forward or reverse cycle movement of the actuating mechanism which involves a transition of the numeral wheel reading from positive to negative or from negative to positive registration. For this purpose advantage is taken of the action of the decimal carry mechanism involved in in said transition, wherein a carry from the lower order wheels is effective upon the numeral wheel related to the highest order carry mechanism, so that the latter wheel may be employed to control the stop whenever it passes forwardly to or reversely from the zero registering position. In order that the numeral wheel shall not be overloaded in this transitional carry movement, a trigger-like arrangement is used whereby the numeral wheel of highest carry order acts merely to release an energized member, which in turn effects the stopping action.

In the drawings the numeral 2 designates the transversely-shiftable carriage, wherein are mounted the numeral wheels 13, the gears of which are adapted to mesh with the intermediate gears 12, the latter being driven by the differential actuating gears 5 upon the shaft 4, all as disclosed in the above-named application. Amounts set up by the selecting mechanism are registered upon the numeral wheels by manipulation of the crank handle 3, having driving connection with the shaft 4 by means of a train of gears 76, 75, 80 and 81.

Upon the left-hand end of shaft 4 is a crank arm 20, having a link connection 21 with rock-lever 22, pivoted at 23 to the framing of the machine. An arm 24, also pivoted at 23, has pivotally mounted thereon a stop element 25, located in the plane of and normally outside the path of movement of the rock-lever 22. The arm 24 has a retraction spring 28 holding the arm normally in rearward position with a suitable lug thereof, in contact with stop 29. The tendency of the spring 26 to move element 25 pivotally into stopping position, and through contact of the lug 30 of the element with the end of trigger 31, to move the arm 24 forwardly, is resisted by the strong spring 28 of the arm.

The numeral wheels 13 are provided with pins $q$, acting to initiate a carry to the next higher wheels in the usual manner, and the pin $q$ of the particular numeral wheel which may be in engagement with the cooperating carry member at the left-hand end of the carry mechanism will always be in position to contact with the double-beveled cam face 32 of the rear end of the trigger 31, as said numeral wheel passes to decimal position in a forward direction, or from decimal position in a reverse direction.

Figure 3:
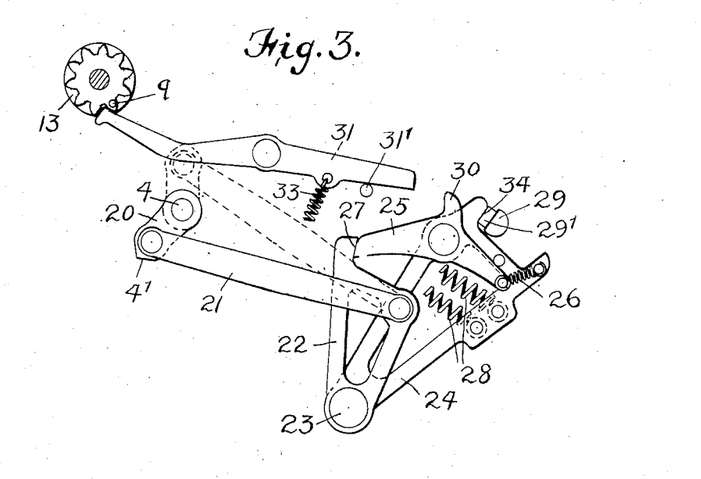
Figure 3 is a side view of the stopping mechanism and adjacent parts, shown in stopping position.
Figure 4:
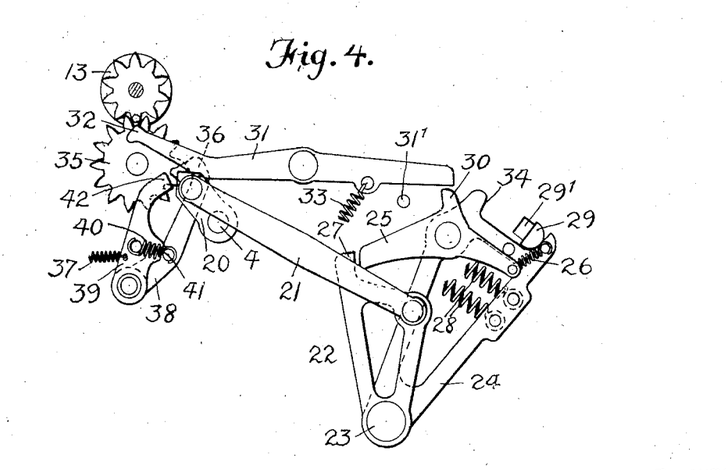
Figure 4 is a similar view, in another position of the parts, the pivoted stop element being shown as tripped.

As a result, the trigger 31 will be operated against the tension of its spring 33, and its forward end will be raised out of engagement with the lug 30 of element 25, whereupon said element, assisted by its spring, will drop into position to engage the free end 27 of the rock-lever 22 as the latter begins its next forward stroke. Ample time is provided for this movement by the positioning of the parts so that the release of element 25 will take place while the crank arm 20 is near its dead center position with relation to link 21, and consequently while rock-lever 22 is moving slowly. The trigger 31 being so operated by the pin $q$, and the element 25 being moved as stated, the lug of this element will move beneath the forward arm of the trigger, which will ride upon said lug during the forward movement of the rock-lever 22 until the latter, through contact with the element 25, has moved said element and the arm 24 as a unit sufficiently forward to move the lug of the element 25 from beneath the forward end of the trigger 31, the latter being then operated by its spring to contact with its stop 31', or to the position shown in figure 3, ready to engage with the lug of the stop element 25 in the return movement of the parts, to thereby restore said element to normal energized position.

The arm 24 will be moved forwardly as stated until it engages at 34 with a suitable fixed stop, shown as a buffer device 29' upon the stop 29, thereby limiting the forward stroke of the rock-lever 22 and further rotation of the shaft 4 and crank handle 3 in this direction.

Figure 1:
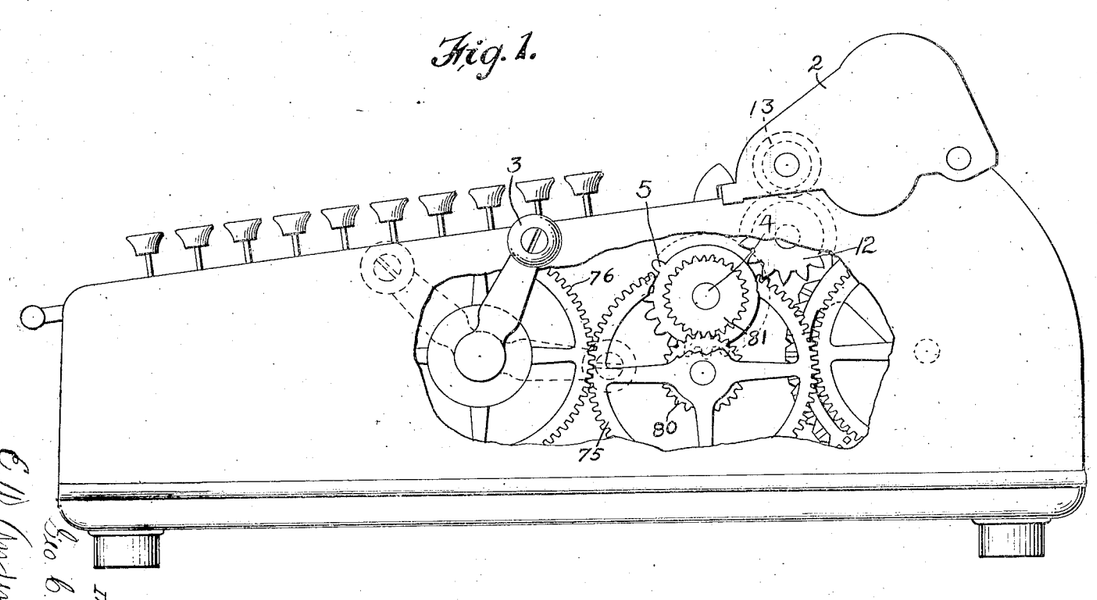
Figure 1 is a side view of a calculating machine to which my invention is shown as applied, with parts broken away.
Figures 2, 5:
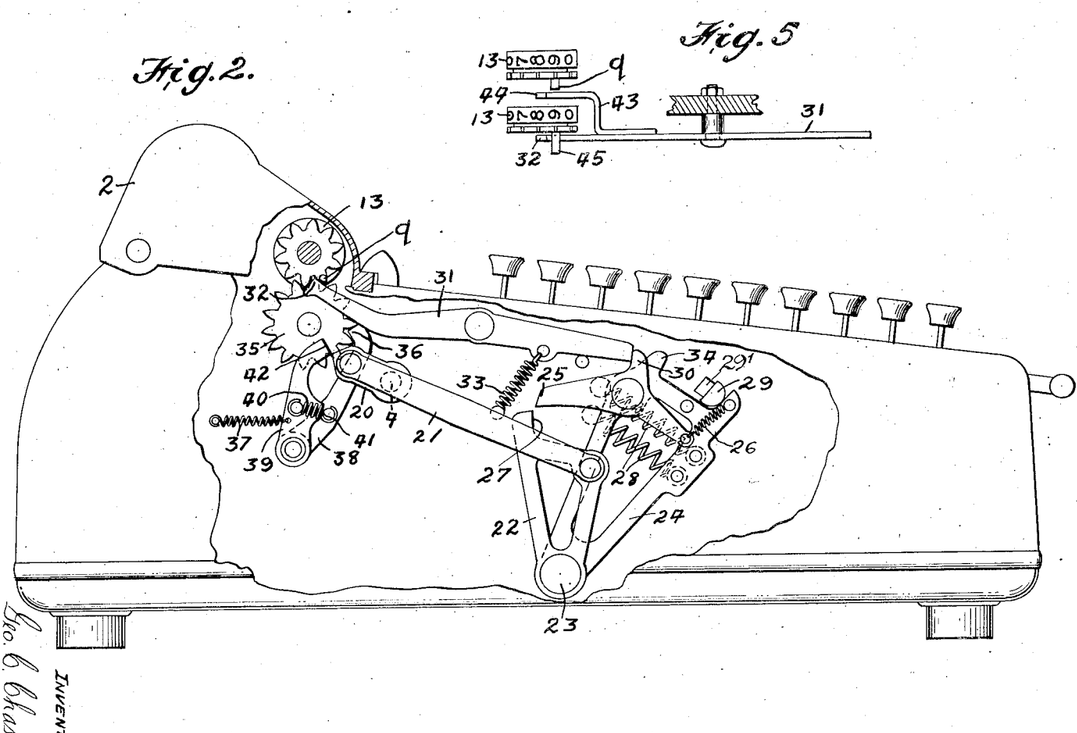
Figure 2 is a similar view of the other side of the machine, with the stopping mechanism shown in normal position.
Figure 5 is a detail plan view of the forked lever and of the two left-hand numeral wheels in one relative position thereof.

Upon reverse movement of the driving mechanism, and during the time that the crank arm 20 is swinging to its dead center position as shown in Figure 2, the normal spring 28 restores the arm 24 to its normal position, in contact with stop 29. The stop element 25 remains in engagement with the free end 27 of rock-lever 22 until lug 30 of element 25 contacts with the forward end of the trigger 31, whereupon the retraction spring 28 overcomes the weaker spring 26 of said stop element, raising the rear end thereof from engagement with said free end 27, the parts now being in their normal position as shown in Figure 2, and said end 27 being now free to pass beneath stop element 25 until trigger 31 is again tripped.

A gear wheel 35, mounted upon the intermediate gear shaft and corresponding to the gear wheel 12' of the application Serial No. 373,834, of E. F. Britten, Jr., meshes with the gear of the numeral wheel 13 related at the time to the cooperating member of the left-hand end of the carrry mechanism of the machine, a spring-pressed check and alignor device having a tooth 36 adapted to enter between the teeth of the gear 35, although the device may have its tooth engage directly the numeral wheel gear or any gear in train therewith.

The spring 37 of this device is of light-tension, sufficient to provide for an overthrow checking action but too light for the purposes of alignment of the numeral wheels. The device is therefore made in compound lever form, the tooth 36 being upon one member 38 thereof, which is connected to the other member 39 by a strong spring 40, holding the members in contact with each other at 41. The member 39 has a double-beveled cam end 42, and the crank arm 20 of the shaft 4 is formed also with a double-beveled cam end 4' (see Figure 3). The related numeral wheel having been moved in a registering operation, and the tooth 36 of the alignor device being at the end of this movement not fully seated between the teeth of the gear 35, the cam end of the lever member 39 will be located in the path of movement of the cam end of the crank arm 20, thereby at the end portion of the movement of said arm forcing said member 39 rearwardly, out of contact with the member 38, which is thereby at once brought under the influence of the stronger spring 40, the latter being of sufficient strength to complete the step of numeral wheel movement, or to align the numeral wheel, by causing the tooth 36 to engage fully between the teeth of the gear 35.

The numeral wheel 13 at the extreme left-hand end of the carriage, being of the highest order, has no carry impulse to initiate, and therefore has no pin $q$. It also happens that this highest order numeral wheel, when the carriage is in extreme right-hand position, occupies a position to the right of the left-hand member of the carry mechanism and so far to the right of the trigger 31 that a pin upon this wheel could not contact with the cam end 32 of said trigger.

To provide for operation of the invention under these conditions, the trigger 31 is provided with an extension branch 43, and the highest order numeral wheel is provided with a pin 45, of location corresponding to that of the pins $q$ of the other wheels but longer than said pins, being adapted to engage the double-beveled cam end 32 of trigger 31 or the double-beveled cam end 44 of the branch 43, to trip the trigger as the highest order wheel passes to decimal position. In order, however, that the pins $q$ of the said other numeral wheels shall not engage said extension fork (which they must not do), said fork is located outside of their path.

When the crank handle is in full-cycle position, at the beginning and end of each cycle of operation in either direction of rotation, the left-hand crank arm 20 of the shaft 4 will occupy a dead center position with relation to link 21, and the cam face of said arm will lie in its position of greatest proximity to the cam face 42 of the lever member 39. The stop element 25 having been tripped by operation of the trigger 31, and the crank arm 20 and crank handle 3 having rotated about 40 degrees from full-cycle position in either direction, the stop will become effective, and during this 40 degree movement in either direction the spring 28 will add materially to the load upon the handle, thereby cushioning the impact and making the stop less abrupt. The spring 28, however, need not be relied upon for this purpose, as obviously any ordinary type of friction governor or dashpot mechanism may be employed. The 40 degrees of movement, more or less, between full-cycle and stopping position corresponds to a portion of the cycle in which no drive occurs to the numeral wheels, as previously stated.

It will be noted that, the stop having been effected, so that further rotation of the crank handle in the same direction is checked or arrested, the stop element 25 will be returned to and relatched in full-cycle position upon the return to normal position of the crank handle, so that continued reverse operation of the crank handle and of the machine will not be interfered with until another tripping of the trigger 31 occurs. It will also be noted that, the crank handle having been returned to full-cycle position and the stop element 25 having also been returned to and relatched in normal position, another forward movement or rotation of the crank handle may take place. Should the operator release the crank handle in stopped position, the return of the parts to full-cycle position and the consequent relatching of the stop element 25 will be effected automatically by the action of spring 28 in returning the link 21 and crank arm 20 to dead center position.

The effect of the stop is to arrest the operation whenever a carry is lost by non-registration thereof, owing to the limitation of capacity of the machine. Its utility in performing addition and in multiplication will be mainly to call attention to the fact of this loss of carry. In operations involving subtraction it will also be of service as indicating the passage from a positive to a negative registration. For instance, in checking up a bank account, it would indicate an overdraft, but would not interfere with the registration of further deposits or checks, and upon the account again showing a balance in favor of the depositor this would in turn be indicated. In division it may be used in one of a number of ways to render the operation automatic, by relieving the operator of the necessity of observing the figures of the successive remainders as they are registered upon the numeral wheels, or other equivalent observation necessary in dividing by the methods commonly in use.

In the preferred automatic method of performing division, the dividend having been registered upon the numeral wheels 13, the counting dials cleared and the carriage properly adjusted, the divisor is set up on the keyboard and the crank handle rotated in subtractive direction. At the end of the cycle of movement during which the remainder has disappeared and has been replaced by a negative registration, the crank handle will be stopped, and the correct quotient figure may now be obtained by a single reverse or additive rotation. This corrective rotation will involve the passage from 9 to 0 registering position of the numeral wheel related to and acting upon the trigger 31 to trip the stop element 25, and consequently at the end of this cycle of movement the handle will again be stopped. If the problem requires carrying out to additional quotient figures, the carriage is now shifted and the operation repeated, the stop affording a convenient position of rest for the hand upon the crank handle during this shifting operation. Should the operation be carried to more places than is necessary, the stop will act upon the first subtractive stroke, and the succeeding additive stroke will leave the registration correct.

In the present invention, the application of controlling means to a machine employing rotary registering means is greatly facilitated by the employment of a reciprocatory or oscillatory driven member. This is particularly evident in the application of cushioning means to a reversible machine, as illustrated herein, wherein two distinct radial stopping positions are provided, and wherein the employment of the oscillatory member allows the stopping contact to be made in a single position and by movement of a contacting part in a single direction.

The application of a full-cycle stop device to a machine having driving means reversible as a whole, or having reversely operable digit-selecting members, as distinguished from a reversing switch machine, is of particular advantage in the performance of division. As has been seen, the automatic performance of division involves the reversal of the operating means following a particular movement of a numeral wheel, such reversal in the present instance being accomplished by a continuation of the crank handle operation in a reverse direction, and being timed by the operation of the stop. This avoids the necessity for throwing a switch, which, if manually accomplished, interrupts the continuity of the operation and the automatic character thereof; and if automatically accomplished acts to load the carry motion of the numeral wheel to a serious extent, since this motion must reverse the drive of each numeral wheel in the machine.

I claim:

1. In a calculating machine, numeral wheels, actuating mechanism therefor, and means for stopping said actuating mechanism including a normally energized restrained element and trigger means controlled by the numeral wheels upon rotation thereof in either direction for tripping said element.

2. In a calculating machine, numeral wheels, actuating mechanism therefor, and means for stopping said actuating mechanism adjacent full cycle position, including a normally energized restrained element and trigger means controlled by the numeral wheels upon rotation thereof in either direction for tripping said element.

3. In a calculating machine, numeral wheels, actuating mechanism therefor, and means for stopping said actuating mechanism adjacent full cycle position, including a normally energized restrained element and trigger means controlled by the numeral wheels for tripping said element, the latter being adapted to be restored to normal position upon a reverse movement of said actuating mechanism.

4. In a calculating machine, reversible numeral wheels, actuating mechanism therefor having a reversible cycle of operation, means for stopping the actuating mechanism adjacent full-cycle position including a normally energized restrained element and trigger means for automatically tripping said element upon forward or reverse operation of the actuating mechanism.

5. In a calculating machine reversible numeral wheels, actuating mechanism therefor having a reversible cycle of operation, means for stopping the actuating mechanism adjacent full-cycle position including a normally energized restrained element and trigger means for automatically tripping said element upon forward or reversed operation of said mechanism, said element being adapted to be restored to normal restrained position upon reverse movement of said mechanism.

6. In a calculating machine, reversible numeral wheels, actuating mechanism therefor having a reversible cycle of operation, and automatic means for stopping the actuating mechanism adjacent full-cycle position in either direction of movement, including a member similarly actuated throughout a forward or a reverse cycle of movement of said actuating mechanism and an element movable into the path of said member.

7. In a calculating machine, numeral wheels, reversible actuating mechanism therefor, and automatic means for stopping the actuating mechanism adjacent full-cycle position in either direction of movement, including a member similarly actuated throughout a forward or reverse cycle of movement of said actuating mechanism, a normally energized restrained element movable into the path of said member, and trigger means controlled by the numeral wheels for tripping said element.

8. In a calculating machine, numeral wheels, reversible actuating mechanism therefor, and means for stopping the actuating mechanism adjacent full-cycle position and against movement in one direction only, without interfering with reverse movement of said mechanism.

9. In a calculating machine, numeral wheels, reversible actuating mechanism therefor, and means controlled by the numeral wheels for stopping the actuating mechanism adjacent full-cycle position and against movement in one direction only, without interfering with reverse movement of said mechanism.

10. In a calculating machine, numeral wheels, actuating mechanism therefor, and means for stopping the actuating mechanism adjacent full-cycle position adapted to be released automatically upon a successive movement of said actuating mechanism.

11. In a calculating machine, numeral wheels, actuating mechanism therefor, means controlled by said wheels for stopping the actuating mechanism, said wheels and the stopping means being shiftable relatively to each other and the stopping means being adapted in cooperation with a single numeral wheel to effect the stop in either of two relatively shifted positions of the wheel and said means.

12. In a calculating machine, numeral wheels, actuating mechanism therefor, said wheels and said actuating mechanism being relatively shiftable to each other, means for stopping the actuating mechanism adapted in cooperation with a plurality of numeral wheels to effect the stop in a plurality of shifted positions of the wheels and said actuating mechanism and further adapted in cooperation with a single numeral wheel to effect the stop in a plurality of relatively shifted positions of the wheel and said mechanism.

13. In a calculating machine, numeral wheels, actuating mechanism therefor, means for stopping the actuating mechanism including a lever having a lateral extension, said wheels and the stopping means being shiftable relatively to each other, and elements related each to a numeral wheel for engaging said lever to effect the stop in a relatively shifted position of the wheels and said means, the element related to one of said numeral wheels being extended to engage the lateral extension of said lever to effect the stop in another relatively shifted position of the wheels and said means.

14. In a calculating machine, reversible numeral wheels, actuating means therefor having a reversible cycle of operation, and means controlled by the numeral wheels for retarding and thereafter stopping said actuating means.

15. In a calculating machine, numeral wheels, actuating mechanism therefor, means for stopping the actuating mechanism including a to-and-fro member, a normally energized restrained element movable into the path of said member, and a trigger device controlled by the numeral wheels for automatically tripping said element, and means for cushioning the stopping means.

16. In a calculating machine, numeral wheels, actuating mechanism therefor, means for stopping the actuating mechanism including a rock lever, a normally energized restrained pivoted element movable into the path of said rock lever, and a trigger controlled by the numeral wheels for automatically tripping said element, and means for cushioning the stopping means.

17. In a calculating machine, numeral wheels, actuating mechanism therefor, means for stopping the actuating mechanism including a rock lever, a pivoted arm, stop means therefor at the end of the movement thereof in either direction, a strong spring holding said pivoted arm normally retracted, a pivoted element mounted upon said arm, having a weak spring and movable thereby into the path of said rock lever, and trigger means controlled by the numeral wheels for automatically tripping said element and normally holding the same under restraint with its spring tensioned.

18. In a calculating machine, numeral wheels, reversible actuating mechanism therefor, and means for stopping the actuating mechanism in one radial position during forward rotation and in another radial position during reverse rotation thereof.

19. In a calculating machine, numeral wheels, differential actuating mechanism therefor, and means for stopping the actuating mechanism in an idle position and beyond full-cycle position.

20. In a calculating machine, numeral wheels, differential actuating mechanism therefor operable selectively in a forward or reverse direction in the performance of problems of opposite nature, and means for stopping the actuating mechanism in an idle position and beyond full-cycle position in either direction of movement thereof.

21. In a calculating machine, numeral wheels, reversible actuating mechanism therefor, means for stopping the actuating mechanism in one radial position during forward rotation and in another radial position during reverse rotation thereof, and means for cushioning the stopping means.

22. In a calculating machine, numeral wheels, differential actuating mechanism therefor, means for stopping the actuating mechanism in an idle position and beyond full-cycle position, and means for retarding said actuating mechanism during the passage thereof from full-cycle to said idle position.

23. In a calculating machine, numeral wheels, actuating mechanism therefor operable selectively in a forward or reverse direction in the performance of problems of opposite nature, means for stopping the actuating mechanism in an idle position and beyond full-cycle position in either direction of movement thereof, and means for retarding said actuating mechanism during the passage thereof in either direction from full-cycle to said idle position.

24. In a calculating machine, numeral wheels, differential actuating mechanism therefor, means for stopping the actuating mechanism in an idle position and beyond full-cycle position, and means for automatically returning the driving mechanism to full-cycle position.

25. In a calculating machine, numeral wheels, reversible actuating mechanism therefor, means for stopping the actuating mechanism in one radial position during forward rotation and in another radial position during reverse rotation thereof, and means for automatically returning the actuating mechanism to full-cycle position from either of said radial positions.

26. In a calculating machine, numeral wheels, differential actuating mechanism therefor, means for stopping the actuating mechanism in an idle position and beyond full-cycle position, and means for cushioning the stopping means during the passage of the actuating mechanism from full-cycle to said idle position, said cushioning means acting automatically to return the actuating mechanism to full-cycle position.

27. In a calculating machine, numeral wheels, reversible actuating mechanism therefor, means for stopping the actuating mechanism including a member operating at variable speed and a normally restrained element, and means for tripping said element as said member passes through a low speed position in either direction of movement of said actuating mechanism.

28. In a calculating machine, numeral wheels, actuating mechanism therefor, means for stopping the actuating mechanism including a member operating at variable speed and a normally restrained element movable into the path of said member, and means for tripping said element as said member passes through a low speed position.

29. In a calculating machine, numeral wheels, actuating mechanism therefor including a shaft and an operating device movable selectively in a forward or reverse direction in the performance of problems of opposite nature, and means controlled by the numeral wheels for stopping the actuating mechanism, including a crank arm upon said shaft and a member having an operating connection with said crank arm, the latter and said operating connection being located on dead center simultaneously with the location of said operating device at full-cycle position at the end of the movement of said device in either direction.

30. In a calculating machine, numeral wheels, actuating mechanism therefor including a shaft and an operating device movable selectively in a forward or reverse direction in the performance of problems of opposite nature, and means controlled by the numeral wheels for stopping the actuating mechanism, including a crank arm upon said shaft, a rock lever and an operating rod connecting said rock lever with said crank, the latter and said rod being located on dead center simultaneously with the location of said device at full-cycle position at the end of the movement of said device in either direction.

31. In a calculating machine, numeral wheels, actuating mechanism therefor including a shaft and an operating device movable selectively in a forward or reverse direction in the performance of problems of opposite nature, and means controlled by the numeral wheels for stopping the actuating mechanism, including a crank arm upon said shaft, a rock lever and an operating rod connecting said rock lever with said crank, the latter and said rod being located on dead center simultaneously with the location of said device at full-cycle position at the end of the movement of said device in either direction, and means for cushioning the stopping means.

32. In a calculating machine, numeral wheels, actuating mechanism therefor including a shaft and an operating device movable selectively in a forward or reverse direction in the performance of problems of opposite nature, and means for stopping the actuating mechanism including a crank arm upon said shaft, a member having an operating connection with said crank arm, the latter and said operating connection being located on dead center simultaneously with the location of said operating device at full-cycle position at the end of the movement of said device in either direction, a normally restrained element movable into the path of said member, and means controlled by the numeral wheels for automatically tripping said element.

33. In a calculating machine, numeral wheels, actuating mechanism therefor including a shaft and an operating device movable selectively in a forward or reverse direction in the performance of problems of opposite nature, and cushioned means controlled by the numeral wheels for stopping the actuating mechanism, including a crank arm upon said shaft, a rock lever having a rod connection with said crank arm, the latter and said rod being located on dead center simultaneously with the location of said device at full-cycle position at the end of the movement of said device in either direction, a pivoted arm, stop means therefor at the end of the movement thereof in either direction, a strong spring holding said pivoted arm normally retracted, a pivoted element mounted upon said arm, having a weak spring and movable thereby into the path of the rock lever, and a lever controlled by the numeral wheels for automatically tripping said element and normally holding the same under restraint with its spring tensioned.

34. In a calculating machine, numeral wheels, actuating mechanism therefor including decimal carry elements, means for stopping the actuating mechanism upon movement of a numeral wheel to decimal position, in combination with means normally active under light spring tension to check said wheels against overrotation and intermittently active under strong spring tension to insure the completion of the step of numeral wheel movement to decimal position.

35. In a calculating machine, numeral wheels, actuating mechanism therefor, including decimal carry elements, means for stopping the actuating mechanism upon movement of a numeral wheel to decimal position, in combination with means normally active to check said wheels against overrotation and intermittently active to insure the completion of the step of numeral wheel movement to decimal position, including a two-part member, a strong spring holding the parts together, a light spring connected with one of the parts and acting to draw the other part into engagement with the numeral wheel, the stopping means being adapted to separate the parts against the tension of said strong spring.

36. In a calculating machine, numeral wheels having projections, actuating mechanism therefor including decimal carry elements, means including a spring-retracted trigger engaged by said projections and an element normally energized and restrained by said trigger for stopping the actuating mechanism upon movement of a numeral wheel to decimal position, said element engaging said trigger when the latter is in normal position and being thereby returned to normal energized position upon a successive operation of the driving mechanism, the projections engaging the trigger to prevent the complete return of the latter to normal position until the completion of the step of numeral wheel movement to decimal position, and means for insuring the completion of the step of numeral wheel movement to decimal position.

37. In a calculating machine, numeral wheels, reversible actuating means therefor comprising an operating device and reversible rotary driving elements, and means including an oscillatory member, driven by one of said rotary elements, for controlling the action of said actuating means.

38. In a calculating machine, numeral wheels, reversible actuating means therefor comprising an operating device and reversible rotary driving elements, and means including an oscillatory member, driven by one of said rotary elements, for stopping the actuating means.

39. In a calculating machine, numeral wheels, actuating means therefor comprising an operating device and rotary driving elements, and means controlled by the numeral wheels and including an oscillatory member, driven by one of said rotary elements, for stopping the actuating means.

40. In a calculating machine, numeral wheels, actuating means therefor comprising an operating device and rotary driving elements, and means controlled by the numeral wheels and including an oscillatory member, driven by one of said rotary elements, for controlling the action of said actuating means.

41. In a calculating machine, numeral wheels, actuating means therefor comprising an operating device and rotary driving elements, and means including an oscillatory member, driven by one of said rotary elements, a normally restrained element movable into the path of said oscillatory member, and means for tripping said restrained element, for stopping the actuating means.

42. In a calculating machine, numeral wheels, reversible actuating means therefor comprising an operating device and reversible rotary driving elements, and means including an oscillatory member, driven by one of said rotary elements, a normally restrained element movable into the path of said oscillatory member, and means for automatically tripping said element upon forward or reverse operation of the actuating means, for stopping said actuating means adjacent full-cycle position.

43. In a calculating machine, numeral wheels, reversible actuating means therefor comprising an operating device and reversible rotary driving elements, and means including an oscillatory member, driven by one of said rotary elements, adapted to stop forward or reverse movement of the actuating means adjacent full-cycle position and against movement in one direction only.

44. In a calculating machine, numeral wheels, actuating means therefor comprising an operating device and rotary driving elements, and means including an oscillatory member, driven by one of said rotary elements, for retarding and thereafter stopping the actuating mechanism adjacent full-cycle position.

45. In a calculating machine, numeral wheels, reversible actuating means therefor comprising an operating device and reversible rotary driving elements, and means including an oscillatory member, driven by one of said rotary elements, for retarding and thereafter stopping the actuating means adjacent full-cycle position.

46. In a calculating machine, numeral wheels, reversible actuating means therefor comprising an operating device and reversible rotary driving elements, and means including an oscillatory member, driven by one of said rotary elements, adapted to stop forward movement of the actuating mechanism in one radial position and to stop reverse movement thereof in another radial position.

47. In a calculating machine, numeral wheels, reversible actuating means therefor comprising an operating device and reversible rotary driving elements, and means including an oscillatory member, driven by one of said rotary elements, adapted to retard and thereafter to stop forward movement of the actuating mechanism in one radial position, and to retard and thereafter to stop reverse movement thereof in another radial position.

48. In a calculating machine, numeral wheels, actuating means therefor comprising an operating device and rotary driving elements, and means including an oscillatory member, driven by one of said rotary elements, adapted to stop forward movement of the actuating means in an idle position and beyond full-cycle position, and to retard said actuating means during the passage thereof from full-cycle to said idle position.

49. In a calculating machine, numeral wheels, reversible actuating means therefor comprising an operating device and reversible rotary driving elements, and means including an oscillatory member, driven by one of said rotary elements, adapted to stop the actuating means in an idle position and beyond full-cycle position in either direction of operation, and to retard said actuating means during the passage thereof from full-cycle to said idle position in either direction of operation.

50. In a calculating machine, numeral wheels, actuating means therefor including digit-selecting members reversely operable to actuate the numeral wheels forwardly or reversely, means controlled by a numeral wheel for stopping the actuating means adjacent full-cycle position, and spring cushioning means for the stopping means.

51. In a calculating machine, numeral wheels, actuating means therefor including digit-selecting members reversely operable to actuate the numeral wheels forwardly or reversely, and means for stopping the actuating means adjacent full-cycle position, including a normally energized restrained element, and trigger means controlled by a numeral wheel for tripping said element during forward or reverse action of the actuating means.

52. In a calculating machine, numeral wheels actuating means therefor including digit-selecting members reversely operable to actuate the numeral wheels forwardly or reversely, and means for retarding and thereafter stopping the actuating means adjacent full-cycle position, including a normally-energized restrained element, and trigger means controlled by a numeral wheel for tripping said element during forward or reverse action of the actuating means.

53. In a calculating machine, reversible numeral wheels, actuating mechanism therefor having a reversible cycle of operation, means for stopping said actuating mechanism adjacent full-cycle position in either direction of movement, including a normally restrained element and means controlled by the numeral wheels for tripping said element, and means for automatically restoring said element to normal position.

54. In a calculating machine, reversible numeral wheels, actuating means therefor having a reversible cycle of operation, and means for stopping said actuating means, including means operable to allow a retarded movement thereof beyond and for returning same to normal full-cycle position.

55. In a calculating machine, reversible numeral wheels, actuating mechanism therefor having a reversible cycle of operation, means for stopping said actuating mechanism at a point beyond full-cycle position, including a normally restrained element and means controlled by the numeral wheels for tripping said element, and means for automatically restoring the actuating mechanism from said stopping position to full-cycle position and for restoring said element automatically to normal position.

56. In a calculating machine, reversible numeral wheels, actuating mechanism therefor having a reversible cycle of operation and automatic means for stopping the actuating mechanism adjacent full-cycle position in either direction of movement, including a member similarly actuated throughout a forward or a reverse cycle of movement, a normally restrained element movable into the path of said member, and means controlled by the numeral wheels for tripping said element.

57. In a calculating machine, reversible numeral wheels, actuating means therefor having a reversible cycle of operation and including reversible rotary elements, and means for controlling the action of said actuating means, having a direction of movement invariable with relation to the cycle of movement of the actuating means and including a to-and-fro member, driven by one of said rotary elements.

58. In a calculating machine, numeral wheels, actuating mechanism therefor including an operation controlling member provided with an idle movement, and means controlled by the numeral wheels for stopping said actuating mechanism, said stopping means being adapted to be released by an idle movement of said operation controlling member.

59. In a calculating machine, numeral wheels, actuating means therefor including differentially acting members and a member manually operable to determine the number of cycles of operation, and means controlled by the numeral wheels for stopping said differentially acting members, said stopping means being adapted to be released by said manually operable member.

60. In a calculating machine, numeral wheels, actuating means therefor including reversible rotary differentially acting members and a member manually operable to determine the number of cycles of operation, and means controlled by the numeral wheels for stopping forward or reverse rotation of said differentially acting members, said stopping means being adapted to be released by said manually operable member.

61. In a calculating machine, numeral wheels, actuating means therefor including differentially acting members and an operating crank manipulable to effect an indefinite number of cycles of operation, and means controlled by the numeral wheels for stopping said differentially acting members, said stopping means being adapted to be released by said operating crank.

In testimony whereof I affix my signature in presence of two witnesses.

GEORGE C. CHASE.

Witnesses:
  P. F. HARNETT,
  JOHN D. WEST.